United States Patent Office 3,284,198
Patented Nov. 8, 1966

3,284,198
METHOD FOR MAKING PHOTOLITHOGRAPHIC PLATE
Henry M. Grotta, Delaware, Ohio, and Myron N. Lugasch, deceased, late of Columbus, Ohio, by Phyllis T. Lugasch, heir, Scranton, Pa., assignors, by mesne assignments, to Martin-Marietta Corporation, New York, N.Y., a corporation of Maryland
No Drawing. Filed Sept. 11, 1963, Ser. No. 308,307
4 Claims. (Cl. 96—33)

The present invention relates to an improved method for making a deep-etch positive photolithographic plate.

The method of the present invention is particularly characterized in that sulfonated diazidocarbazole is used as a component in the light sensitive coating composition.

Generally speaking, the method of the present invention comprises the steps of coating a metallic plate with an aqueous coating composition comprising sulfonated diazidocarbazole and polymeric colloid, drying the coating, exposing the coating to a light image, applying deep-etch developers to the coating to remove the portion of coating not struck by light and expose the metal thereunder, deep-etching the exposed metal, cleaning the exposed metal, applying a lacquer coating to the partially coated plate, applying deep-etch developing ink to the lacquer coating, washing with warm water to remove the stencil, and applying gum arabic to the plate.

Such things as inorganic dichromates, diazonium salts, diazo oxides, certain nitro compounds, and free radical generators have been previously used as sensitizing agents in deep-etch photolithographic plate manufacture. However, these sensitizing agents have one or more of the following disadvantages and limitations, e.g. they are unstable in solution and can only be kept for short periods; they decompose rapidly when coated on plates; and stencil removal on overexposed plates is difficult or even impossible.

The above disadvantages and limitations have been overcome by the present invention, and additional advantages have been provided as follows.

The photolithographic plates produced according to the method of the present invention have good dot fidelity, complete absence of background, easy "sighting" of exposure during the development process, and are stable for long periods when stored in the presensitized condition. The method is economical because only a very small quantity of sensitizer is required. Stencils may be removed merely by washing with warm water, and there is no evidence of prior stencil failure. Moreover, sulfonated diazidocarbazole does not decompose on zinc, aluminum or chromium surfaces, and appears to decompose only in light, which is desirable, or on strong heating.

A suitable coating composition may be prepared by mixing sulfonated diazidocarbazole and water, adding alkali to assist in dissolving the sulfonated diazidocarbazole, stirring the solution into an aqueous polymeric colloid composition, such as hydroxyethyl cellulose or polyvinyl pyrrolidone, and filtering through cheesecloth to remove bubbles.

The following is an illustrative and non-limiting example of the method of the present invention.

*Example 1*

Sulfonated diazidocarbazole may be prepared as follows.

Nitration of carbazole to form 1,6- and 3,6-dinitrocarbazole is conducted as follows. Charge 100 lbs. glacial acetic acid into a reactor, add 5.1 lbs. 100% carbazole, cool to 30° C., add 2.3 lbs. sodium nitrite, add at 30°–34° C. over one hour a mixture consisting of 4.75 lbs. 95% nitric acid and 10 lbs. glacial acetic acid, heat to 50° C. over 10 minutes, stir at 50° C. for 2 hours, heat to 80° C. over 45 minutes, add 12 lbs. glacial acetic acid, heat at 90°–100° C. for 2 hours, cool to 50° C., let stand at 50° C. for 12 hours, and recover the solids by filtration. Wash the solids with 10 lbs. glacial acetic acid, slurry the solids in 100 lbs. glacial acetic acid at 50° C. for 4 hours, recover the solids by filtration at 50° C., wash the solids with 10 lbs. glacial acetic acid, wash the solids with water at room temperature until acid free, and dry the resulting mixture of 1,6- and 3,6-dinitrocarbazole.

Sulfonation of the mixture of 1,6- and 3,6-dinitrocarbazole to produce a mixture of 1,6- and 3,6-dinitrocarbazole-disulfonic acid isomers is conducted as follows. Charge 1,000 gms. sulfuric acid into a reactor, add 290 gms. of the above mixture of 1,6- and 3,6-dinitrocarbazole, stir at 50° C. for 1 hour, heat to 80° C. and stir for 1 hour while permitting the temperature to rise to 110° C. from the heat of reaction, cool to 30° C., add q.s. ice and water to bring the volume to 6 liters, neutralize with 50% sodium hydroxide, and recover the solids by filtration.

The mixture of 1,6- and 3,6-dinitrocarbazoledisulfonic acid is reduced to a mixture of 1,6- and 3,6-diaminocarbazoledisulfonic acid as follows. The above resulting solids are added to 3 liters of water, 320 gms. ground iron are added, and 60 gms. of 30% hydrochloric acid are added. Boil for 12 hours, cool to 90° C., add 25 gms. sodium carbonate, add 20 gms. activated boneblack, stir 30 minutes, filter and recover the filtrate, evaporate the filtrate to 2 liters, allow the filtrate to stand for 12 hours while the solids precipitate, recover the solids by filtration, and dry the resulting mixture of 1,6- and 3,6-diaminocarbazoledisulfonic acid isomers at 80° C.

The remainder of the synthesis is conducted in subdued light.

26.9 gms. of the mixture of 1,6- and 3,6-diaminocarbazoledisulfonic acid slurried with 200 ml. hydrochloric acid and 1 liter of water, is tetrazotized at less than 10° C. by adding, during 20 minutes, 20.7 gms. sodium nitrite in 100 ml. water. After an additional 25 minutes of agitation, the tetrazonium salt solution (carbazoledisulfonic acid 1,6- and 3,6-tetrazonium dichloride) is recovered by filtration, 600 additional ml. of water having been added thereto in washing the reaction vessel and filtering.

30 gms. of sodium azide in 200 ml. water is added, with stirring, to the tetrazonium salt solution, causing foaming and precipitation. Following two hours of stirring, the solid (mixture of 1,6- and 3,6-diazidocarbazoledisulfonic acid) is recovered by filtration and dried over calcium chloride at 60° C. under vacuum.

The light sensitive coating composition is prepared by slurrying 1 gm. of the mixture of 1,6- and 3,6-diazidocarbazoledisulfonic acid isomers in 50 ml. of water, adding enough concentrated ammonium hydroxide, about 1 ml., to dissolve the solids, stirring the solution into a composition of 5 gms. hydroxyethyl cellulose (WP-09) in 50 ml. water, and filtering through cheesecloth to remove bubbles.

An aluminum plate is whirl coated in conventional warm air chamber, at 40–100 r.p.m. with the above coating composition.

Selected portions of the plate are then struck with light by exposing them to a commercial-type carbon arc lamp of approximately 30 amperes at a distance of about 30 inches for 2–10 minutes.

Conventional deep-etch developers, consisting of about 40° Bé. aqueous solutions of calcium chloride and zinc chloride, are applied to the coating to remove the portion of coating not struck by light and expose the metal thereunder.

The metal thus exposed is deep-etched in the conventional manner with an aqueous salt solution of HCl, $CuCl_2$ and $FeCl_3$.

The exposed metal areas are cleaned with anhydrous denatured ethyl alcohol.

A lacquer coating is then applied to the partially coated plate.

Conventional deep-etch developing ink, e.g. a pigmented oil ink, is then applied to the lacquer coating.

The plate is then washed with warm water to remove the stencil, following which the plate is coated with gum arabic in the conventional manner.

What is claimed is:

1. The method for preparing a deep-etch photolithographic plate comprising the steps of coating a metallic plate with an aqueous coating composition comprising sulfonated diazidocarbazole and polymeric colloid, drying the coating, exposing the coating to a light image, applying deep-etch developers to the coating to remove the portion of coating not struck by light and expose the metal thereunder, deep-etching the exposed metal, cleaning the exposed metal, applying a lacquer coating to the partially coated plate, applying deep-etch developing ink to the lacquer coating, washing with warm water to remove the stencil, and applying gum arabic to the plate.

2. The method according to claim 1, and further characterized in that said aqueous coating composition is alkaline.

3. The method according to claim 2, and further characterized in that said sulfonated diazidocarbazole is a mixture of 1,6- and 3,6-diazidocarbazoledisulfonic acid isomers.

4. The method according to claim 1, and further characterized in that said aqueous coating composition comprises ammonium hydroxide, hydroxyethyl cellulose, and a mixture of 1,6- and 3,6-diazidocarbazoledisulfonic acid isomers.

References Cited by the Examiner
UNITED STATES PATENTS

| | | | |
|---|---|---|---|
| 2,692,826 | 10/1954 | Neugebauer et al. | 96—91 |
| 2,937,085 | 5/1960 | Seven et al. | 96—33 |
| 3,062,644 | 11/1962 | Neugebauer et al. | 96—33 |

NORMAN G. TORCHIN, *Primary Examiner.*

C. L. BOWERS, *Assistant Examiner.*